March 11, 1969     R. P. BURR     3,431,638
METHOD OF MANUFACTURING TOROIDALLY WOUND DISC ARMATURES
Filed May 9, 1966     Sheet 1 of 5
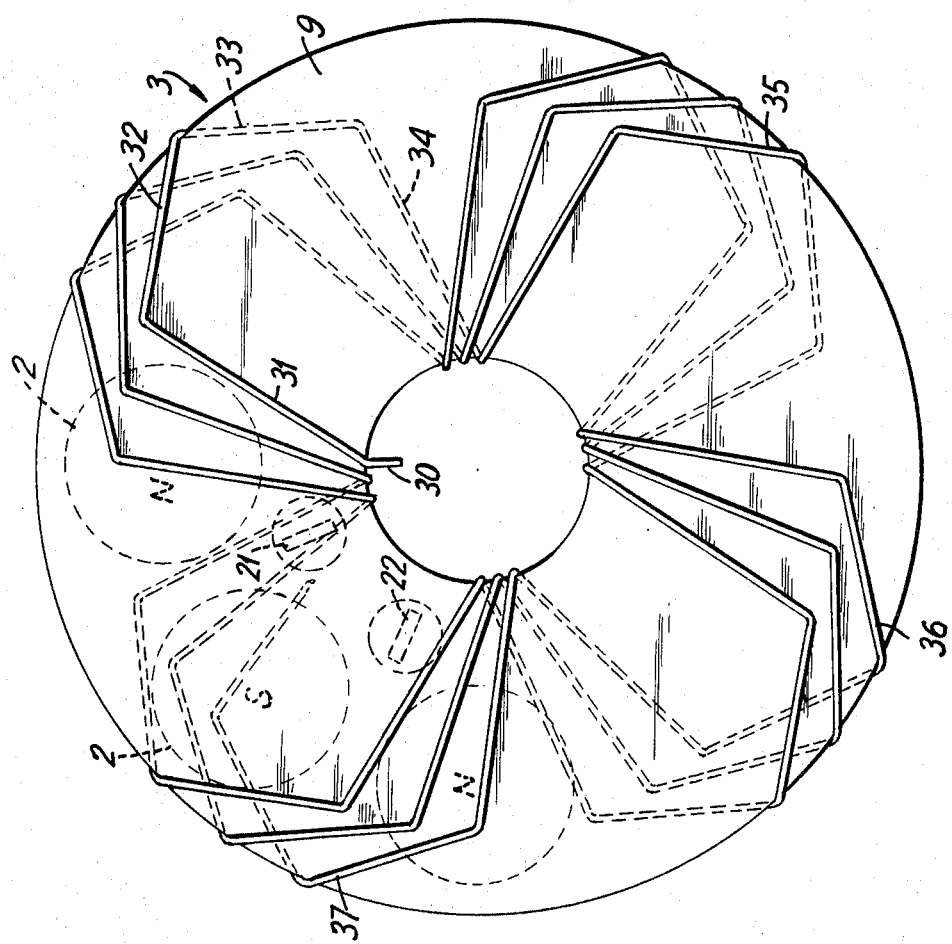
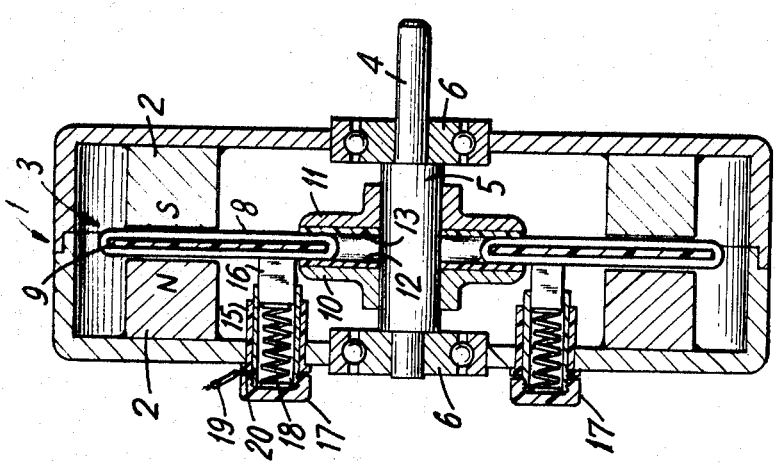
INVENTOR.
ROBERT P. BURR
BY
Morgan, Finnegan, Durham & Pine
ATTORNEYS.

March 11, 1969     R. P. BURR     3,431,638
METHOD OF MANUFACTURING TOROIDALLY WOUND DISC ARMATURES
Filed May 9, 1966

INVENTOR.
ROBERT P. BURR
BY
Morgan, Finnegan, Durham & Pine
ATTORNEYS.

INVENTOR.
ROBERT P. BURR
BY
*Morgan, Finnegan, Durham & Pine*
ATTORNEYS.

March 11, 1969  R. P. BURR  3,431,638
METHOD OF MANUFACTURING TOROIDALLY WOUND DISC ARMATURES
Filed May 9, 1966

INVENTOR.
ROBERT P. BURR
BY
Morgan, Finnegan, Durham & Pine
ATTORNEYS.

United States Patent Office 3,431,638
Patented Mar. 11, 1969

3,431,638
METHOD OF MANUFACTURING TOROIDALLY WOUND DISC ARMATURES
Robert Page Burr, Huntington, N.Y., assignor to Circuit Research Company, Glen Cove, N.Y., a corporation of New York
Filed May 9, 1966, Ser. No. 548,459
U.S. Cl. 29—598    14 Claims
Int. Cl. H02k 15/08; B65h 81/02

This invention relates to electrical machines having disc type armatures and, more particularly, to methods for making the armature for such machines.

Motors having disc type armatures have been developed in recent years primarily using printed circuit techniques to form the armature. See for example Patents No. 3,144,574 issued Aug. 11, 1964, to J. Henry-Baudot and No. 3,171,051 issued Feb. 23, 1965, to Robert P. Burr. Normally these machines are constructed without any appreciable iron in the armature and therefore result in a very low inertia motor having smooth linear torque characteristics and an absence of cogging or preferred armature position.

Essential to the manufacture of these electrical machines on a commercial scale is an efficient production method, preferably one using conventional type machinery. An object of this invention is to provide such methods for the manufacturing of disc type armatures.

It is another object to provide low cost methods of making an armature for a disc type electrical machine wherein a minimum quantity of copper is used.

In accordance with the method of this invention a toroidal coil winding machine is used to place insulated wire on an annular mandrel or form to provide the arrangement of conductors required in the disc type armature. This is accomplished by controlling the relative speeds of the toroidal winder and the rotation of the mandrel.

In the completed armature the spacing between successive radially extending segments of the winding should be approximately equal to the spacing between adjacent pole centers of the stator, and hence, when the insulated wires are placed on the form the relative speeds are controlled so that the spacing between successive segments is in accordance with this desired spacing.

In accordance with one embodiment of the invention the conductors are placed on a flat annular mandrel and thereafter spread apart to increase the working area within the armature turns. In another embodiment of the invention the relative winding speeds are varied in a manner which achieves a similar working area within the armature turns without a subsequent shaping operation. In still another embodiment of the invention insulated wire is placed on a doughnut shaped mandrel which is thereafter crushed into a planar disc like configuration. With this latter type armature the spacing of the wires when initially placed on the form is in accordance with the distance between pole centers and is selected so that the distance between successive radial segments will be approximately equal to the distance between pole centers in the completed disc configuration of the armature.

The manner in which the foregoing and other objects are achieved in accordance with this invention is described more fully in the following specification which sets forth several illustrative embodiments of the invention. The drawings form part of the specification wherein:

FIGURE 1 is a cross sectional view of a motor including an armature constructed in accordance with the method of this invention;

FIGURE 2 is a plan view showing several turns of a completed armature for the motor of FIGURE 1;

Figure 3:
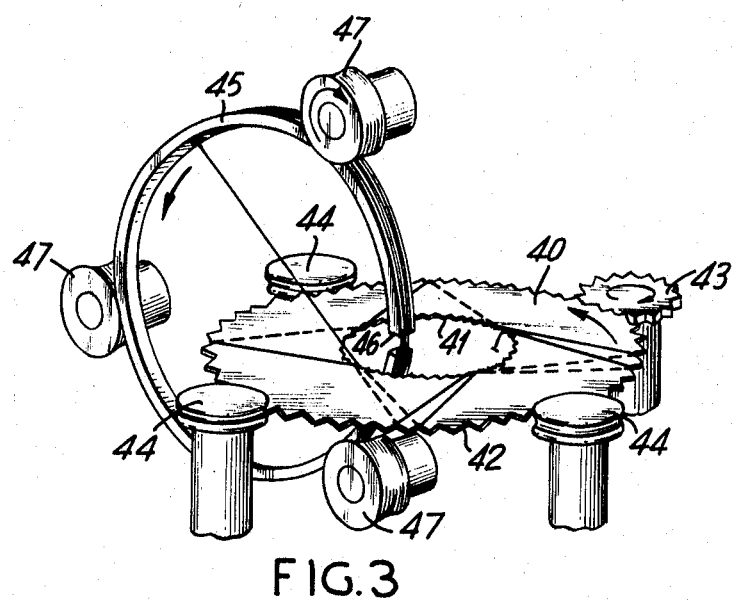
FIGURES 3 and 3A are perspective and plane views respectively illustrating the manner in which the wire is toroidally wound about an annular mandrel.

Before describing the methods of making armatures in accordance with this invention it may be helpful to first consider the completed machine as shown in FIGURES 1 and 2. The motor housing 1 includes two substantially identical members each having a circular base plate and an integral cylindrical portion extending from the periphery of the base plate. The illustrative motor is an eight pole machine and therefore eight cylindrical slugs 2 of an aluminum-nickel-cobalt alloy material such as Alnico are secured to the end of the base plates. These slugs are evenly distributed to form an annular area of pole faces and are each secured to the base plate by means of an adhesive such as epoxy cement. The slugs are magnetized to provide pole faces of alternating north and south magnetic polarities as indicated by the designations "N" and "S." The magnetic slug on one side of the armature 3 faces a slug on the opposite magnetic polarity on the other side of the armature.

The armature is mounted on a shaft 4 having an increased diameter portion 5 positioned between a pair of ball bearings 6 to prevent axial movement. The bearings are centrally mounted within suitable openings in the base plates of housing 1. Armature 3 consists of an armature winding of insulated wire 8 surrounding a dielectric form 9. The armature is clamped between a pair of flanged hub members 10 and 11 which are rigidly secured to shaft 4. Dielectric spacers 12 and 13 insulate the armature winding from the hub members 10 and 11 respectively.

Each of the brush holders for the machine include an insulated sleeve 15 which is secured in a suitable opening in one of the base plates of the housing. The brushes 16 are rectangular in cross-section and extend from the brush holders through suitable rectangular openings. The end of the brush holder opposite this rectangular opening is externally threaded and adapted to receive a cap 17. A spring 18 is located between the cap and the brush to urge the brush toward the armature and to complete the electrical circuit from conductor 19 via a conductive pressure plate 20 with the cap. The insulation is abraded off a portion of the armature winding conductors in the area adjacent the brushes to thereby provide a commutating surface. Preferably, the flange diameter of hub member 11 is sufficient to provide structural backing in the commutating zone.

The number of brushes and their positions relative to the magnetic poles depends upon the type of armature winding and the current carrying requirements for the brushes. For an eight pole motor having a wave type armature winding and moderate current requirements, there would normally be two brushes 21 and 22 positioned to engage the neutral conductors (conductors positioned between the magnetic pole faces) approximately as shown in FIGURE 2.

The armature includes a large number of radially extending segments distributed evenly about an annular area which will be adjacent the magnetic pole faces in the completed machine. These radially extending segments are interconnected to form a continuous winding which is in the form of a relatively thin disc. Successive radially extending segments of the winding are displaced by a distance approximately equal to the distance between pole centers of the associated magnetic stator structure and are interconnected so that current flowing in the winding will flow in one direction across the stationary magnetic south poles and in the opposite direction across the south poles.

The armature in a disc type machine will normally have relatively few turns in the completed winding when compared to conventional machines with cylindrical armatures. The back EMF in the case of a motor, and the generated potential in the case of a generator, are functions of the number of winding turns which are connected in series and therefore, since there are relatively few available turns in the disc type machine, it is desirable to utilize a type of winding that places the largest possible number of armature turns in series. This is best achieved by utilizing a wave type armature winding in which there are two parallel paths, each path including half the armature turns connected in series with one another. Although wave windings are considered preferable, and although the illustrations pertain to wave windings, it should be obvious that the methods set forth herein are also applicable to the other types of windings such as lap windings.

As illustrated in FIGURE 2 the insulated wire for the armature is wound around a dielectric disc 9 which is in the shape of an annulus. The winding begins with a lead 30, tentatively secured at the inner edge of the disc, and then proceeds outwardly toward the periphery via a segment 31, and then proceeds in a more clockwise direction around the outer edge of the disc via a segment 32. The winding proceeds in a similar fashion toward the center of the form via segments 33 and 34 on the other side of the disc to complete the first armature turn. It should be noted that the distance between winding segments 31 and 34 is approximately equal to the distance between adjacent pole centers of the magnetic slugs 2. The second, third and fourth turns 35, 36 and 37, respectively, are similarly formed in succession to complete the first armature loop. The completed armature loop takes on the appearance of a four bladed propeller, the four blades being the four armature turns each spanning approximately 90-degree segments.

The first armature loop spans slightly less than 360 degrees and ends up in the proper position for begining the second armature loop positioned slightly counterclockwise with respect to the first armature loop. Likewise, each successive loop is located slightly counterclockwise with respect to the preceding loop. In an eight pole machine the last armature loop ends at a point displaced by 90 degrees from the beginning of the winding and therefore one additional turn is added to complete the winding. When this last turn is added, the winding returns to the starting point. The end of the winding is connected to lead 30 to thereby form a closed armature winding.

In designing the winding the total number of armature turns is usually one more or one less than a multiple of the number of pole faces. This is done so that the winding is either progressive or regressive thereby distributing itself evenly over the disc.

FIGURES 3–6 illustrate one method of making the armature using a toroidal winding machine. The winding is formed about a flat annular mandrel 40 blanked from a sheet of thermo sensitive or heat deformable plastic. The inner and outer edges 41 and 42, respectively, are provided with notches used to position the armature winding on the mandrel. The number of notches on the inner edge of the mandrel is equal to the number of notches on the outer edge and the number of notches in each set is equal to the number of armature turns in the completed winding. The notches on the periphery or outer edge of the mandrel are preferably in the shape of gear teeth which mesh with the teeth of a drive gear 43. Several idler pulleys 44 are positioned about the periphery of the disc form to maintain it in a generally horizontal position in engagement with drive gear 43.

Hoop-shaped bobbin 45 is part of a convention toroidal winding machine and includes a slot 46 sufficient to accommodate the insertion of the mandrel and removal of the unit after the winding is completed. The hoop-shaped bobbin is positioned in a plane perpendicular to that of the disc form with the hoop passing through the center of the annulus. The hoop is positioned by means of three drive rollers 47.

After the mandrel has been inserted, insulated wire of the proper length for the armature winding is transferred on to the bobbin by rotating it in a clockwise direction. After the bobbin has been loaded, the free end of the wire is attached to the mandrel at some convenient point to form the start of the winding. Thereafter, the bobbin is rotated in a counterclockwise direction toroidally depositing insulated wire about the annular mandrel while the mandrel is rotated about its axis in a counterclockwise direction. The rotation of the mandrel is maintained in synchronism with the bobbin by means of suitable interconnecting cams, gearing and the like.

Figure 3A:
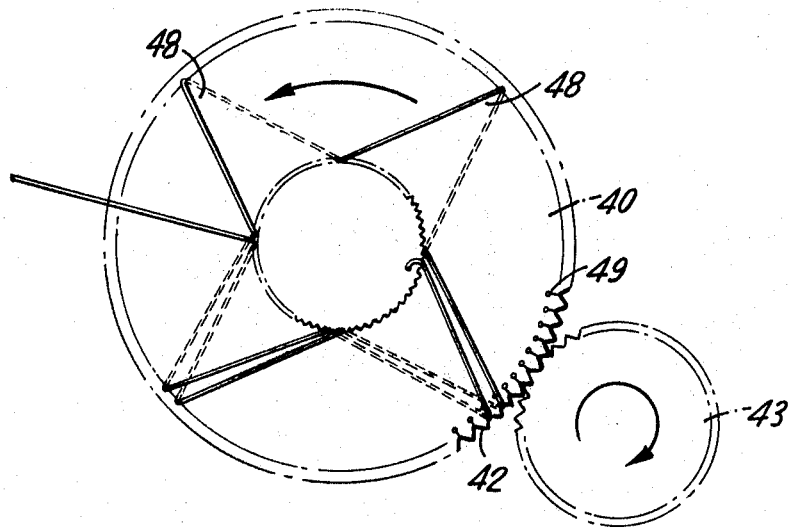

In forming a wave armature winding the average ratio of the angular speed of the bobbin compared to the angular speed of the mandrel is approximately equal to one-half the number of magnetic poles in the associated stator of the machine. For an eight pole machine the ratio would be approximately 4:1. Accordingly, during one revolution of the mandrel while one armature loop is being formed, the bobbin completes four revolutions to form the four armature turns. As shown in FIGURE 3A the winding appears as a succession of armature loops in the shape of four pointed stars, each point of the star being a separate armature turn 48.

The actual speed ratio differs slightly from one-half the number of poles in order to bring about a slight indexing of one armature loop relative to the next. Thus, as shown in FIGURE 3A, when the bobbin has completed four revolutions, the mandrel is one notch short of a complete revolution, this being the proper position for the beginning of the next armature loop.

The winding having a configuration as shown in FIGURE 3A with a triangular area within the armature turns could be used in a motor. However, the efficiency of the winding is a function of the area within the armature turn and this is true particularly with respect to the portion of the area near the periphery of the winding where the greatest amount of torque can be developed. The area within the armature turns is increased by the shaping process illustrated in FIGURES 4 and 5.

Figure 5:
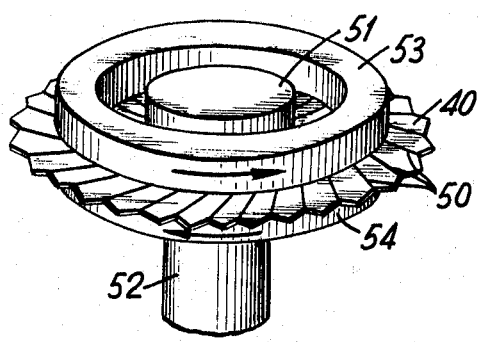
Figure 6:
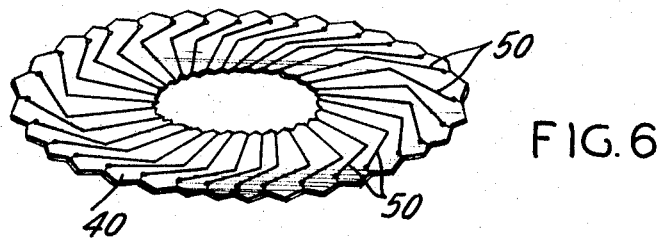
FIGURE 6 is a perspective view of a completed armature made by the method illustrated in FIGURES 3–5.

The mandrel 40 having the conductors 50 of the winding thereon is clamped about the center opening by a suitable fixture including a nut 51 threaded toward the cooperating shoulder of a cylindrical jig 52. A pair of forming rings 53 and 54 are then brought into engagement with the conductors of the winding. Each of the rings includes an array of forming pins 55 and 56 respectively extending therefrom, the number of pins in each of the rings being the same as the number of radially extending segments of the winding. Thus, when the forming rings are brought together into enagement with the winding there will be a pin between each pair of conductors. The rings are then rotated in opposite directions as shown in FIGURE 5 to thereby spread the conductors and increase the area within the armature turns. The completed armature winding is as shown in FIGURES 2 and 6.

Figure 4:
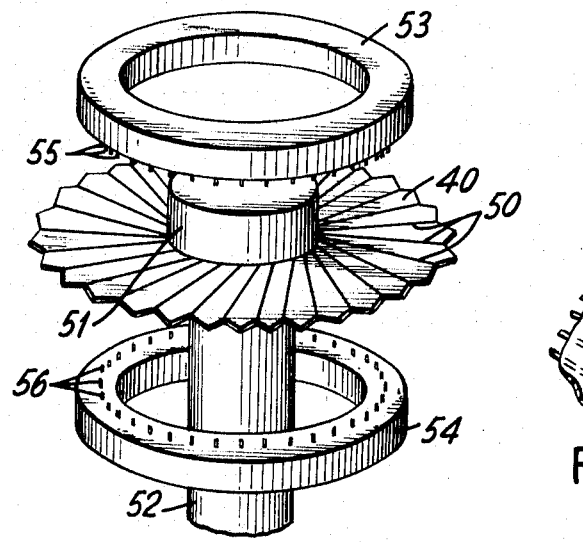
FIGURES 4 and 5 are perspective views illustrating the manner in which the area within armature loops is increased.
Figure 4A:
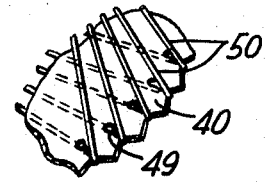
FIGURES 4A and 5A are illustrations showing details of the conductors at the periphery of the mandrel and FIGURES 5B and 5C are cross sectional views of the forming rings shown in FIGURES 4 and 5.
Figure 5A:
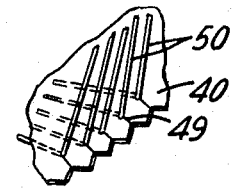

A slot 49 is provided at the apex of each notch on the outer periphery of the disc as shown in FIGURES 3A and 4A, and each slot ends in a small aperture having a diameter approximately equal to the diameter of the wire. During the shaping operation as the conductors are spread, the tension in the conductors increases at the periphery of the mandrel tending to draw the conductors into the slots toward the center of the mandrel. The conductors 50 are positioned as shown in FIGURE 4A before the shaping operation and appear as shown in FIGURE 5A after the shaping operation.

Figure 5B:
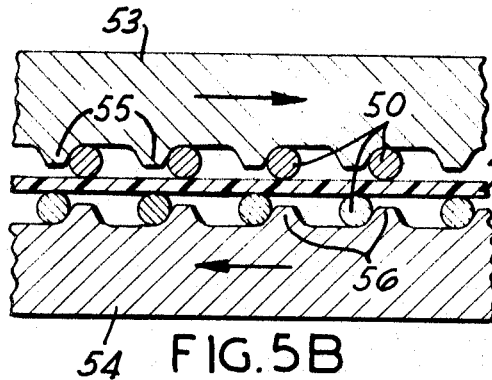
Figure 5C:
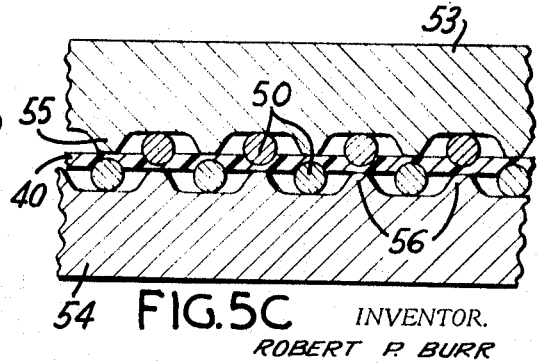

The length of the forming pins 55 and 56 in the forming rings is preferably less than the diameter of the conductors 50 in the winding as shown in FIGURE 5B. Heat can then be applied to the forming rings at the same time pressure is applied to embed the conductors in the mandrel as shown in FIGURE 5C. The mandrel is preferably made from a heat deformable plastic and the wire is preferably coated with thermo setting adhesive. Therefore the conductors will be held in position in the mandrel which becomes the dielectric support disc for the armature. Where a particularly thin disc armature is desired additional pressure can be applied to the forming rings to not only completely embed the conductors in the support disc, but to also at least partially flatten the conductors. The forming rings are dimensioned to at least cover the annular area within the working air gap adjacent the magnetic pole faces.

Figure 7:
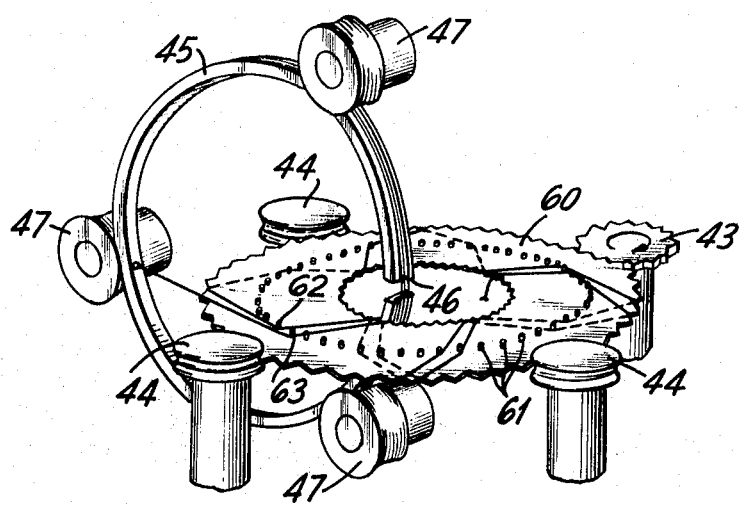
FIGURES 7 and 8 are perspective and plan views respectively illustrating another method of making the armature.
Figure 8:
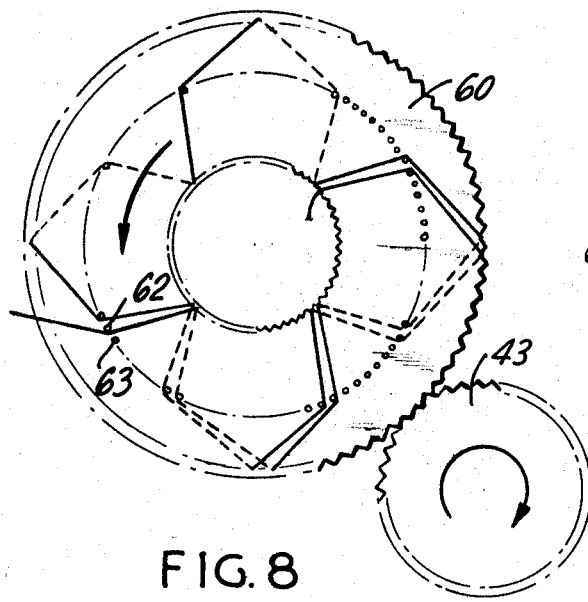
Figure 9:
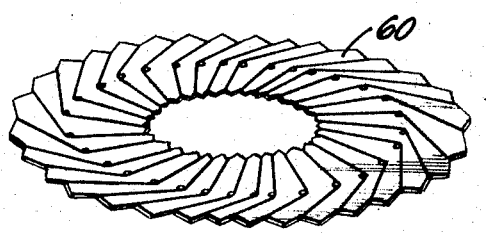
FIGURE 9 is a perspective view of a completed armature made by the method illustrated in FIGURES 7 and 8.
Figure 10:
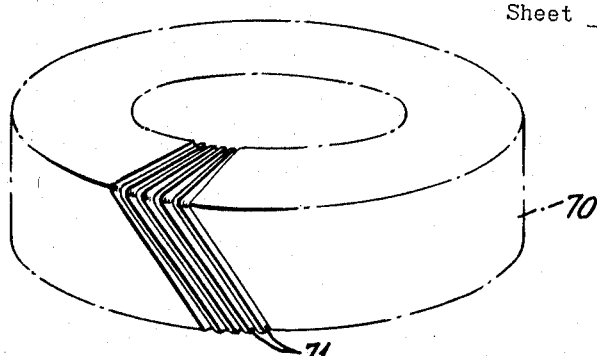
FIGURES 10–13 are perspective views illustrating still another method of making armatures for a disc type motor.

The shaping operation can be eliminated by using the method illustrated in FIGURES 7–9. As shown in FIGURE 7 the mandrel 60 which can be formed by injection molding includes an array of positioning pins 61 which extend above and below the mandrel. The circular array of positioning pins is located intermediate the inner and outer edges of the mandrel. The number of positioning pins is equal to the number of armature turns, and hence, is equal to the number of notches along the inner and outer edges. The mounting of the mandrel and the associated hoop-shaped bobbin of the toroidal winder are essentially the same as previously described.

The relative angular speeds of the form and the winding hoop vary during their respective revolutions so that the insulated wire drops into the desired positions and is thereafter held in position by the positioning pins and the notches along the edges of the mandrel. For example, as bobbin 45 swings toward a position where the wire becomes horizontal (approximately as shown in FIGURE 7) the mandrel is aligned so that the wire falls between the proper set of positioning pins, e.g., pins 62 and 63. The form is then advanced so that as the wire drops over the outer edge of the mandrel the proper notch is in line. The mandrel is next moved to line up a set of positioning pins on the underside of the mandrel as the wire swings into a horizontal position below the mandrel, and the mandrel then moves to line up the inner notch as the wire swings up and around the inner edge of the mandrel. In this manner the winding is placed upon the mandrel with the desired configuration as shown in FIGURE 8.

The winding operation can be accurately controlled by having either the form or the bobbin rotate at a constant speed and by varying the speed of the other, or by varying the speed of both. Except for the difference to allow for indexing, the average speed ratio for forming a wave winding is maintained at one-half the number of poles, i.e., 4:1 for an eight pole machine. When the winding returns to the starting point, the free ends are interconnected to thereby complete the closed armature winding.

After the armature winding is formed it is placed between a pair of heated platens which are then urged together to press the winding into the mandrel and to flatten the positioning pins. The completed armature winding appears as shown in FIGURE 9.

Another method of toroidally forming a disc shaped armature is illustrated in FIGURES 10–13. The mandrel 70 is a generally doughnut shaped member 70 constructed from an expanded heat deformable plastic such as Styrofoam. The mandrel must be highly compressible, but at the same time it is desirable that the exterior surfaces be resistant to deformation as the insulated wire is deposited on the mandrel. The surface can be plain or can include grooves 71 positioned to guide the conductors of the winding into the desired positions.

The mandrel and the hoop-shaped bobbin of the toroidal winder are arranged in a manner similar to that previously described. The mandrel is clamped between several drive rollers 72 which keep the mandrel in a horizontal position and rotating at the desired speed. For a wave winding the bobbin and the mandrel are rotated at approximately constant speeds while maintaining the speed ratio approximately equal to one-half the number of poles in the associated stator structure. The cross section of the mandrel largely determines the spacing between successive radially extended segments of the completed armature winding, and is therefore selected in accordance with the spacing between adjacent pole centers of the associated magnetic structure.

Figure 11:
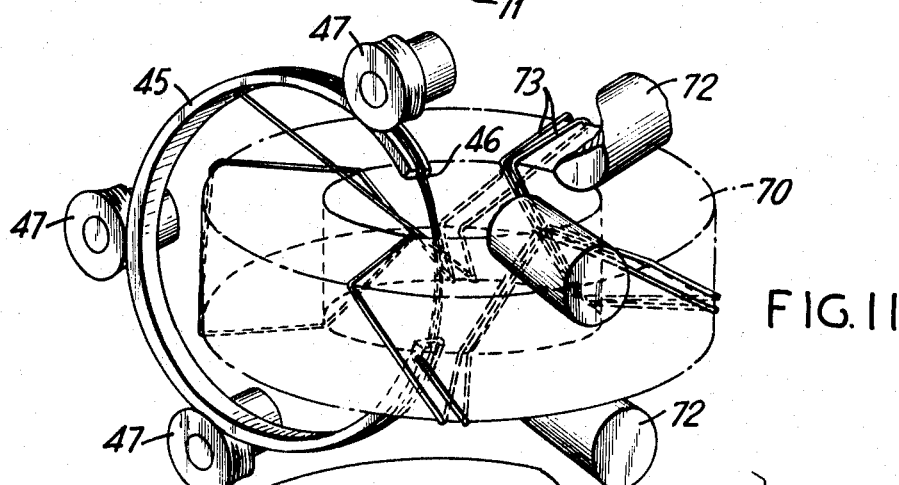
Figure 12:
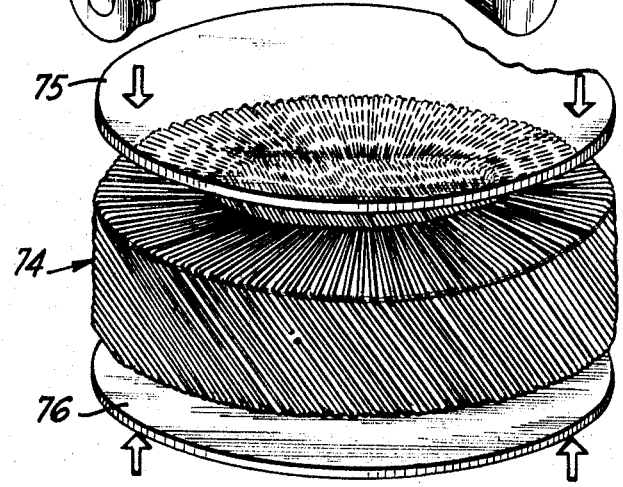
Figure 13:
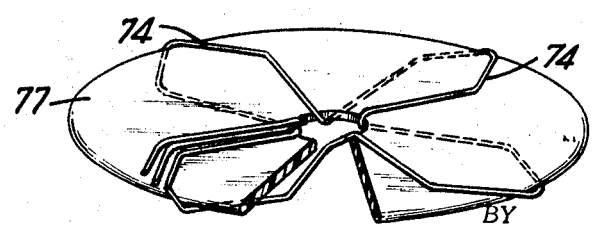

The first several turns 73 of the wave winding are shown properly positioned in FIGURE 11 and the completed winding 74 is illustrated in FIGURE 12. After the winding is completed it is placed between a pair of heated platens 75 and 76 which are forced together to crush the form into a flat disc like configuration. The closure rate of the platens is controlled in accordance with the temperature of the platens and the characteristics of the mandrel material so that no appreciable melting takes place until the winding has nearly reached a disc like configuration. For example, a typical mandrel would be 0.75 inch thick and would be compressed to a thickness of approximately 0.125 inch before any melting took place. In this manner the mandrel preserves the dimensioned accuracy of the winding during the crushing operation. The applied heat should be sufficient to melt the mandrel so that it becomes a support disc for the winding and rigidly maintains the winding 74 in the desired configuration as shown in FIGURE 13. In some cases where the conductors are sufficiently heavy, or where a separate dielectric support disc is included within the mandrel, it may be desirable to dissolve out the Styrofoam material after the armature has been crushed into the disc configuration. Although Styrofoam has been described as the mandrel material, it should be obvious that other highly compressible materials could be employed. The mandrel may include iron particles to improve the magnetic properties of the machine, or stiffening members clamping discs or special commutator support structure.

In each of the methods, the disc like armature winding, once formed, is mounted on the motor shaft by means of a suitable hub structure such as shown in FIGURE 1. The insulation is abraded off the conductors in the commutation zone adjacent the brushes. If sufficient pressure is applied to the conductors while embedding them in the mandrel or while crushing the mandrel, the conductors will be flattened somewhat and thereby provide an improved commutating surface.

While the foregoing specification pertains primarily to wave windings, it should be understood that other types of windings, such as lap windings, can be made by properly controlling the relative speeds of the winding bobbin relative to the mandrel.

Also it should be noted that even though the specification pertains primarily to motors, the armatures for electrical generators can be made in a similar fashion. There are numerous variations within the scope of this invention which is more particularly defined in the appended claims.

What is claimed is:
1. A method of making an armature for a disc type electrical machine having a multipole stator, comprising:
   mounting a mandrel in the shape of an annulus for controlled rotation about its axis;
   toroidally winding insulated wire about said mandrel to provide successive turns of the armature winding;
   controlling the angular speed of said toroidal winding and the angular speed of said mandrel
      to have successive radially extending portions of the armature winding spaced approximately in accordance with the spacing between adjacent pole centers of the stator for the machine; and to have the winding distributed substantially uniformly over the surface of the mandrel, continuing winding until returning to the starting point; and connecting the beginning of said winding to the end thereof to provide a multi-turn closed armature winding.

2. The method of making an armature in accordance with claim 1 wherein said mandrel is rotated continuously in one direction while the armature is being wound to thereby provide a wave winding.

3. The method of making an armature in accordance with claim 1 wherein said winding is pressed into said mandrel which becomes a dielectric support disc for the armature.

4. A method of making an armature for a disc type multipole electrical machine, comprising:

toroidally winding wire upon an annular mandrel while said mandrel is rotating about its axis;

maintaining the average ratio of the angular toroidal winding speed to the angular speed of said mandrel approximately equal to one half the number of poles in the completed machine, said actual average speed ratio differing therefrom by an amount sufficient to index the winding so that the surface of the mandrel is uniformly covered;

continuing said winding until returning to the starting point and connecting the beginning of said winding to the end thereof to provide a closed armature winding.

5. The method in accordance with claim 4 wherein said annular mandrel is constructed from a highly compressible material and wherein said mandrel is crushed after the winding is placed thereon to thereby provide a substantially planar armature winding including the crushed mandrel as a dielectric support disc.

6. The method in accordance with claim 4 wherein said winding is formed on a flat annular mandrel and wherein each of the radially extending segments on one side of said mandrel are moved clockwise while the radially extending segments on the opposite side of said mandrel are moved counterclockwise to thereby increase the working area within the turns forming the armature winding.

7. A method of making an armature for a disc type electrical machine having a multipole stator comprising:

mounting an expanded plastic mandrel in the shape of an annulus for controlled rotation about its axis;

toroidally winding insulated wire about said mandrel to provide successive turns of the armature winding;

controlling the angular speeds of said toroidal winding and said mandrel rotation to space successive radially extending portions of the armature winding in accordance with the spacing between pole centers of the associated stator, and to index the mandrel during successive revolutions so that the winding is uniformly distributed;

continuing the winding until returning to the starting point and interconnecting the ends of the winding to thereby form a closed armature winding;

crushing said mandrel with the armature winding thereon into a generally planar disc configuration.

8. A method of making an armature in accordance with claim 7 wherein the mandrel is dissolved after the armature is at least partially crushed into said planar configuration.

9. A method of making an armature in accordance with claim 7 wherein said mandrel is made from an expanded heat deformable plastic and wherein heat is applied to said mandrel to permanently deform the same to maintain said armature winding in said substantially planar configuration and to form the dielectric support disc for the winding.

10. A method of making an armature in accordance with claim 9 wherein said crushing and application of heat are controlled so that said armature winding assumes a generally planar configuration before any significant heat deformation takes place.

11. A method of making an armature for a disc type electrical machine having a multipole stator comprising:

mounting a flat mandrel in the shape of an annulus for controlled rotation about its axis;

toroidally winding insulated wire about said mandrel to provide successive armature turns of the armature winding;

indexing said form so that said turns of the armature winding are substantially uniformly distributed about said mandrel;

continuing the winding until returning to the starting point, and interconnecting the ends of the winding to thereby form a closed armature winding;

spreading apart the portions of each turn appearing on opposite sides of said mandrel so that successive radially extending segments of said armature winding are spaced at distances approximately equal to the distance between pole centers of the associated stator.

12. The method of making armatures in accordance with claim 11 wherein said mandrel is made from a heat deformable plastic and wherein heat and pressure are applied to said armature winding after the turns thereof are spread apart to thereby embed the winding in the mandrel which becomes the dielectric support disc for the armature.

13. A method of making an armature for a disc type motor having a multipole stator comprising:

mounting for controlled rotation a substantially planar mandrel in the shape of an annulus having positioning pins extending from the planar surfaces thereof at points intermediate the edges;

toroidally winding insulated wire about said mandrel, each successive toroidally wound turn forming a successive turn of said armature winding;

controlling the angular speeds of said form and said toroidal winding to space successive radially extending segments of the armature winding in accordance with the spacing between adjacent pole centers of the associated stator with the radially extending segments of an armature turn passing around a pair of spaced apart positioning pins to thereby obtain an increased working area within the armature turn, and to index the form so that the winding is uniformly distributed;

continuing the winding until returning to the starting point, and interconnecting the ends of the winding to thereby form a closed armature winding.

14. A method of making an armature in accordance with claim 13 further comprising the steps of embedding said armature winding in said mandrel and removing said positioning pins.

References Cited

UNITED STATES PATENTS

| 680,793 | 8/1901 | Lamme | 310—203 |
| 2,726,817 | 12/1955 | Barrows | 242—4 |
| 3,047,935 | 8/1962 | Reichelt | 29—605 |
| 3,292,024 | 12/1966 | Kober | 310—268 X |

JOHN F. CAMPBELL, Primary Examiner.

C. E. HALL, Assistant Examiner.

U.S. Cl. X.R.

29—423, 605; 242—5; 310—268